United States Patent
Hartmann (10) Patent No.: US 11,645,830 B2
(45) Date of Patent: May 9, 2023

(54) DETERMINING DISTRIBUTION AND/OR SORTING INFORMATION FOR THE AUTOMATED DISTRIBUTION AND/OR SORTING OF A CONSIGNMENT

(71) Applicant: Bernd Hartmann, Grafschaft-Leimersdorf (DE)

(72) Inventor: Bernd Hartmann, Grafschaft-Leimersdorf (DE)

(73) Assignee: Deutsche Post AG, Bonn (DE)

( * ) Notice: Subject to any disclaimer, the term of this patent is extended or adjusted under 35 U.S.C. 154(b) by 308 days.

(21) Appl. No.: 16/929,945

(22) Filed: Jul. 15, 2020

(65) Prior Publication Data
US 2021/0016324 A1   Jan. 21, 2021

(30) Foreign Application Priority Data
Jul. 15, 2019   (DE) .................... 10 2019 119 138.6

(51) Int. Cl.
| | | |
|---|---|---|
| G06T 19/00 | (2011.01) | |
| B07C 3/14 | (2006.01) | |
| G06T 7/66 | (2017.01) | |
| G06T 7/73 | (2017.01) | |
| G06V 10/46 | (2022.01) | |
| G06F 18/21 | (2023.01) | |
| G06K 9/62 | (2022.01) | |
| G06V 10/44 | (2022.01) | |

(Continued)

(52) U.S. Cl.
CPC .............. *G06V 10/462* (2022.01); *B07C 3/14* (2013.01); *G06F 18/21* (2023.01); *G06T 7/66* (2017.01); *G06T 7/73* (2017.01); *G06T 2207/20081* (2013.01); *G06V 2201/10* (2022.01)

(58) Field of Classification Search
CPC ............ H04N 1/00381; H04N 1/00307; G06F 3/017; G06F 16/434
See application file for complete search history.

(56) References Cited

U.S. PATENT DOCUMENTS

| | | | |
|---|---|---|---|
| 6,269,171 B1 | 7/2001 | Gozzo et al. | |
| 6,944,345 B2 * | 9/2005 | Hayashi .............. | H04N 1/3875 348/E5.045 |

(Continued)

FOREIGN PATENT DOCUMENTS

| | | |
|---|---|---|
| DE | 603 08 025 T2 | 3/2007 |
| DE | 10 2006 051 777 A1 | 5/2008 |

(Continued)

*Primary Examiner* — Yosef Kassa
(74) *Attorney, Agent, or Firm* — Reinhart Boemer Van Deuren P.C.

(57) ABSTRACT

A method performed by at least one apparatus is disclosed in which image data is obtained that represents an image of a surface of a consignment captured by an image sensor. At least partially on the basis of the image data, metadata associated with the image data is determined. The metadata represent a plurality of image features of the image represented by the image data. Each image feature of the image features represented by the metadata is an image component of the image represented by the image data. Distribution and/or sorting information is determined for the automated distribution and/or sorting of the consignment at least partially on the basis of the image features represented by the metadata.

19 Claims, 6 Drawing Sheets

(51) Int. Cl.
    *G06V 10/56*          (2022.01)
    *G06V 30/10*          (2022.01)

(56) References Cited

U.S. PATENT DOCUMENTS

| | | | |
|---|---|---|---|
| 7,809,158 B2 * | 10/2010 | Carpenter | B65H 7/125 |
| | | | 382/199 |
| 8,144,118 B2 * | 3/2012 | Hildreth | A63F 13/00 |
| | | | 463/2 |
| 8,254,630 B2 * | 8/2012 | Abe | G06V 40/162 |
| | | | 382/103 |
| 8,329,058 B2 * | 12/2012 | Li | G02F 1/1334 |
| | | | 349/1 |
| 8,559,132 B2 * | 10/2013 | Takano | G11B 5/3116 |
| | | | 360/125.12 |
| 8,655,077 B2 * | 2/2014 | Hayashi | H04N 9/87 |
| | | | 382/190 |
| 8,717,288 B2 * | 5/2014 | Hildreth | G06T 7/215 |
| | | | 463/2 |
| 9,151,953 B2 * | 10/2015 | Qaddoura | G06F 3/005 |
| 9,697,233 B2 * | 7/2017 | Di | G06K 9/6215 |

FOREIGN PATENT DOCUMENTS

| | | |
|---|---|---|
| DE | 601 32 593 T2 | 1/2009 |
| DE | 10 2007 038 186 A1 | 2/2009 |
| DE | 10 2008 008 967 A1 | 8/2009 |
| DE | 10 2010 013 220 A1 | 9/2011 |

\* cited by examiner

DETERMINING DISTRIBUTION AND/OR SORTING INFORMATION FOR THE AUTOMATED DISTRIBUTION AND/OR SORTING OF A CONSIGNMENT

CROSS-REFERENCE TO RELATED PATENT APPLICATIONS

This patent application claims the benefit of German Patent Application No. 10 2019 119 138.6, filed Jul. 15, 2019, the entire teachings and disclosure of which are incorporated herein by reference thereto.

FIELD

Example embodiments of the invention relate to a method, an apparatus, a system and a computer program for determining distribution and/or sorting information for the automated distribution and/or sorting of a consignment.

BACKGROUND

Methods are known in the prior art in which the characters contained in address fields of consignments are automatically recognized and evaluated in order to be able to sort and distribute the consignments automatically. If the characters contained in an address field cannot be captured or cannot be captured completely (e.g. because the address field is partially hidden or is affixed around a corner of the consignment) or the characters are, for example, Arabic, Cyrillic, Greek or Asian characters (e.g. Thai, Chinese or Japanese characters), an automatic recognition and evaluation is frequently not possible, so that a manual evaluation (e.g. using a translator) must be performed in these cases.

SUMMARY OF SOME EXAMPLE EMBODIMENTS OF THE INVENTION

The object of the present invention is therefore, inter alia, to overcome the disadvantages of the prior art described above.

According to the invention, a method performed by at least one apparatus is disclosed, wherein the method comprises:

obtaining image data, wherein the image data represent an image of a surface of a consignment captured by an image sensor, determining, at least partially on the basis of the image data, metadata associated with the image data, wherein the metadata represent a plurality of image features of the image represented by the image data, wherein each image feature of the image features represented by the metadata is an image component of the image represented by the image data, and determining distribution and/or sorting information for the automated distribution and/or sorting of the consignment at least partially on the basis of the image features represented by the metadata.

That the method is performed by at least one apparatus is intended to be understood to mean, for example, that either all steps of the method are performed by the same apparatus (e.g. one of the apparatuses disclosed below), or that the steps of the method are performed at least partially by different apparatuses (e.g. a plurality of the apparatuses disclosed below).

According to the invention, an apparatus is disclosed, wherein the apparatus comprises means configured to perform the disclosed method or the respective means to perform the steps of the disclosed method. One or more steps can be performed by the same means, or different steps can be performed by different means. The means of the disclosed apparatus can comprise hardware components and/or software components.

The means can comprise, for example, at least one memory with program instructions of a computer program (e.g. the computer program disclosed below) and at least one processor designed to execute program instructions from the at least one memory. An apparatus which comprises at least one processor and at least one memory with program instructions is correspondingly also intended to be understood as disclosed, wherein the at least one memory and the program instructions are configured, together with the at least one processor, to cause the apparatus to perform and/or to control the disclosed method with the at least one processor.

The means of the apparatus can furthermore comprise, for example, an (e.g. wireless and/or wired) communication interface (e.g. a wireless or wired network adapter) and/or a user interface (e.g. a keyboard, a mouse, a screen, a touch-sensitive screen, a loudspeaker, a microphone, a camera, etc.) and/or an image sensor, e.g. a CMOS sensor, a CCD sensor or a camera). The apparatus can obviously alternatively or additionally comprise further means.

The apparatus is, for example, a server. A server of this type may, for example, be both a physical server (i.e. a server with hardware components and/or software components) and a virtual server. A virtual server is intended to be understood to mean, for example, a server functionality provided by hardware components and/or software components of one or more physical servers (e.g. a plurality of servers of a server cloud). A plurality of physical servers can interwork, for example, in order to provide the server functionality of a virtual server of this type.

According to the invention, a system comprising a plurality of apparatuses is further disclosed, wherein the apparatuses are configured for the joint performance of the disclosed method. One of the apparatuses is, for example, one of the apparatuses disclosed above (e.g. a server) and another of the apparatuses is, for example, an automatic sorting and/or distribution apparatus.

According to the invention, a computer program is further disclosed, wherein the computer program comprises program instructions which are designed, when executed by at least one processor, to cause an apparatus (e.g. the disclosed apparatus(es)) to perform the disclosed method.

The disclosed computer program is contained and/or stored, for example, on a computer-readable storage medium. A computer-readable storage medium is intended to be understood to mean, for example, a physical and/or tangible storage medium.

The disclosed method, the disclosed apparatus(es), the disclosed system and the disclosed computer program are provided, for example, for determining distribution and/or sorting information for the automated distribution and/or sorting of a consignment.

The features of the disclosed method, the disclosed apparatus(es), the disclosed system and the disclosed computer program are described below, in part by way of example.

A consignment is, for example, a package item, a package consignment (e.g. a package) and/or a mail consignment (e.g. a letter). An address field containing characters which indicate the recipient and/or the sender of the consignment are typically located on the surface of a consignment of this type. The surface of the consignment is intended to be understood to mean the outwardly visible surface of the consignment, in particular the wrapping (e.g. the packaging) of the consignment.

The obtaining of the image data by the at least one apparatus which performs the disclosed method is intended to be understood to mean, for example, that the image data are received from a remote apparatus (e.g. via a wireless or wired communication connection) or are generated by an image sensor which is part of the apparatus which performs the disclosed method. Correspondingly, the image sensor may, for example, be part of the at least one apparatus which performs the method, or part of an apparatus which is remote from the at least one apparatus which performs the method.

The image data represent the image of the surface of the consignment captured by the image sensor, for example in coded and/or digital form (e.g. as a raster graphic and/or pixel graphic). In particular, the image data can represent the surface of the consignment captured by the image sensor according to a standardized image data format. One example of a standardized image data format of this type for a raster graphic and/or pixel graphic is the JPEG File Interchange Format (JFIF) or the Tagged Image File Format (TIFF). The JFIF image data format is specified, inter alia, by ITU-T Recommendation T.871 which is currently available at https://www.itu.int/rec/T-REC-T.871; and the specification of the TIFF image data format is currently available in version 6.0 at https://www.adobe.io/open/standards/TIFF.html.

The image data are generated, for example, by the image sensor as a result of the capture of the surface of the consignment in such a way that they represent the image of the surface of the consignment captured by the image sensor. The image sensor can obviously capture the entire surface or a part of the surface of the consignment. The image represented by the image data can correspondingly represent the entire surface or a part of the surface of the consignment.

Metadata associated with the image data are determined at least partially on the basis of the image data. In other words, the image data are taken into account in determining the metadata associated with the image data. Determining the metadata associated with the image data comprises, for example, the application of an image-processing method and/or an image-processing algorithm (e.g. a segmentation method and/or a segmentation algorithm as disclosed in detail below) to the image data or the image represented by the image data.

The meta data are associated with the image data in that they represent a plurality of image features of the image represented by the image data. The metadata associated with the image data can, for example, be added to the image data and/or can be stored together with the image data. The metadata can obviously also be separate from the image data and/or can be stored separately from the image data.

An image component of the image represented by the image data is, for example, each element (e.g. one or more pixels) and/or segment (e.g. a group of pixels) contained in the image, such as an edge, a corner, a region, a key point or a pattern. An image feature is intended to be understood to mean, for example, an image component characteristic of the image represented by the image data and/or an (e.g. predetermined) image section of the image represented by the image data. An image feature of this type (e.g. each of the image features) is, for example, a segment contained in the image and/or in an (e.g. predetermined) image section of the image such as an edge, a corner, a region, a key point or a pattern. Determining the metadata correspondingly comprises, for example, determining the image features at least partially on the basis of the image data. The image features can be obtained, for example, as a result of the application of a segmentation method and/or a segmentation algorithm to the image data and/or to the image represented by the image data. Examples of segmentation methods and/or segmentation algorithms of this type are pixel-oriented segmentation methods (e.g. threshold value methods), edge-oriented segmentation methods (e.g. edge detection methods such as the Sobel operator, the Scharr operator or the Laplace filter), region-oriented segmentation methods (e.g. the region growing method), model-based segmentation methods (e.g. the Hough transform) and detection methods for detecting key points (e.g. detection methods according to the SIFT (Scale-Invariant Feature Transform) algorithm or the SURF (Speeded Up Robust Features) algorithm). The invention is obviously not restricted to these segmentation methods and/or segmentation algorithms.

Determining the metadata further comprises, for example, determining a representation of the image features. That the metadata represent a plurality of image features of the image represented by the image data is intended to be understood, for example, to mean that the metadata represent a respective characteristic (e.g. a position, a shape, a size, a color or an orientation of the image component) of the respective image feature or a characteristic of the respective surrounding area of the respective image feature for each of the image features. For this purpose, the metadata can represent a respective representation in the form of a vector which contains and/or describes one or more characteristics of the respective image feature for each of the image features. A vector of this type can be obtained, for example, as a result of the application of a method and/or an algorithm to the image data and/or to the image represented by the image data. Examples of a method of this type and/or an algorithm of this type are a method and/or an algorithm for describing key points such as the SIFT (Scale-Invariant Feature Transform) algorithm or the SURF (Speeded Up Robust Features) algorithm. The image features can be represented correspondingly by the metadata as SIFT image features or SURF image features in the form of a vector. The invention is obviously not restricted to these methods and/or algorithms.

The distribution and/or sorting information for the automated distribution and/or sorting of the consignment is then determined at least partially on the basis of the image features represented by the metadata. In other words, the image features represented by the metadata are taken into account in determining the distribution and/or sorting information for the automated distribution and/or sorting of the consignment. The distribution and/or sorting information for the automated distribution and/or sorting of the consignment is determined according to an (e.g. predetermined) algorithm and/or data model. An algorithm of this type and/or a data model of this type obtain, for example, the image features represented by the metadata as input parameters. The algorithm and/or data model can predetermine, for example, which distribution and/or sorting information is intended to be determined for which image features represented by the metadata.

For this purpose, the algorithm (e.g. a classifier and/or classification method) and/or the data model (e.g. a database or an artificial neural network) can take into account, for example, the distribution and/or sorting information determined for other consignments and image features of images of the surfaces of these other consignments. In other words, the data model may be based on distribution and/or sorting information determined for other consignments and image features of images of the surfaces of these other consignments. In particular, the data model may not contain any information relating to the consignment for which distribution and/or sorting information for the automated distribution and/or sorting of the consignment are presently determined.

Distribution and/or sorting information determined for other consignments can, for example, be stored in entries of a database together with representations of image features of images of the surfaces of these other consignments, so that the image features represented by the database can be compared with the image features represented by the metadata.

If the comparison indicates that image features of an entry represented by the database are at least essentially similar (e.g. based on a similarity measure and/or a predetermined similarity threshold value) or correspond to the image features represented by the metadata, it can be provided, for example, that the distribution and/or sorting information stored in the database entry together with the representation of these image features is assigned to the image features represented by the metadata and is determined as distribution and/or sorting information for the automated distribution and/or sorting of the consignment. The comparison can be performed, for example, according to a comparison method for comparing image features or their representations such as a comparison method for comparing image features (e.g. SIFT or SURF image features) in the form of vectors in which the distance (e.g. the Euclidean distance) between the respective vectors is used as a similarity measure (i.e. the shorter the distance between two vectors, the more similar the image features represented by the vectors).

The distribution and/or sorting information for the automated distribution and/or sorting of the consignment can be determined correspondingly on the basis of the image features represented by the metadata as long as image features stored in the database at least essentially similar or corresponding to the image features represented by the metadata can be obtained as a result. Since the image features are determined independently from a recognition and evaluation of the characters contained in the address field, the result of this comparison is independent from the capability of the image sensor to capture or completely capture the characters contained in the address field (e.g. because the address field is partially hidden or is affixed around a corner of the consignment) or the characters are, for example, Arabic, Cyrillic, Greek or Asian characters (e.g. Thai, Chinese or Japanese characters), so that the disadvantages described above in connection with the prior art are overcome.

The distribution and/or sorting information for the automated distribution and/or sorting of the consignment is configured, for example, to influence (e.g. to control) the distribution and/or sorting of the consignment by an automatic distribution and/or sorting apparatus, for example so that the consignment is sorted together with other consignments which are intended to be delivered in the same delivery area as the consignment. The distribution and/or sorting information can be provided (e.g. printed), for example, in written form and/or in the form of a two-dimensional code on the surface of the consignment. One example of a two-dimensional code of this type is an alphanumeric code, a barcode or a QR code. One example of a provision in written form is an address indication in a predetermined language (e.g. the official language of the delivery area).

In one example embodiment of the invention, at least one of the image features is at least one of the following image components:

a respective region contained in the image,
a respective corner contained in the image,
a respective edge contained in the image,
a respective key point contained in the image, and/or
a respective pattern contained in the image.

A plurality or each of the image features can obviously be at least one of these components.

As disclosed above, each of these image components is a respective segment contained in the image which can be obtained as a result of a segmentation method and/or segmentation algorithm applied to the image.

The respective region, corner, edge, key point and/or pattern contained in the image is, for example, an address field of the consignment or a part of the address field of the consignment. Only the address field of the consignment, for example, or image components which are part of the address field of the consignment are taken into account in determining the metadata (e.g. in determining the image features during the determination of the metadata). Alternatively or additionally to the address field of the consignment, other image sections of the image can obviously also be taken into account in determining the metadata (e.g. in determining the image features during the determination of the metadata).

In one example embodiment of the invention, the metadata, for at least one of the image features, represent at least one of the following characteristics of the respective image feature or its surrounding area:

a size (e.g. in the form of an area indication and/or a number of pixels which are part of the image feature) of the respective image feature, a shape and/or outline (e.g. in the form of a length indication of the extent and/or a number of pixels which are adjacent to the image feature, and/or in the form of a Fourier descriptor) of the respective image feature, a position of the respective image feature,
a color of the respective image feature or in the surrounding area of the respective image feature, an orientation of the respective image feature or its surrounding area, a geometric center of the respective image feature,
moments (e.g. mass (e.g. in the form of a sum of the gray values of the pixels which are part of the image feature), or a core area of the image feature (e.g. in the form of an averaging of the mass and/or an averaging of the product of position and mass)) of the respective image feature or its surrounding area.

If the image feature is, for example, an address field of the consignment or a part of the address field of the consignment, the metadata can represent, for example, geometric and/or topological characteristics of the characters contained in the address field, such as, for example:

an area used by the characters (e.g. in the form of an area indication and/or a number of pixels), a mass of the characters (e.g. in the form of a sum of all gray values of the pixels which are part of the characters), an extent of the characters (e.g. in the form of a number of all pixels which are adjacent to the characters), a core area of the characters (e.g. in the form of an averaging of the product of position mass).

It is assumed here, for example, that all patterns, corners and/or edges which are part of the address field correspond to characters, so that the metadata represent, for example, geometric and/or topological characteristics of all patterns, corners and/or edges contained in the address field in order to represent the geometric and/or topological characteristics of the characters contained in the address field.

The invention is obviously not restricted to the disclosed characteristics, and the metadata can alternatively or additionally also represent other characteristics (in particular geometric and/or topological characteristics) of the respective image feature or its surrounding area. The characteristics are preferably rotation-invariant and/or reflection-invariant and/or translation-invariant.

For a plurality or each of the image features, the metadata can obviously represent at least one of these characteristics of the respective image feature or its surrounding area.

Determining the metadata correspondingly comprises determining the characteristic(s) of the respective image feature(s). The characteristics of the respective image feature(s) are determined in this way, for example, according to the method and/or algorithm disclosed above for describing key points, such as the SIFT (Scale-Invariant Feature Transform) algorithm or the SURF (Speeded Up Robust Features) algorithm. The features can be represented correspondingly by the metadata as SIFT image features or SURF image features.

In one example embodiment of the invention, the metadata represent one or more of the image features in the form of a vector. The metadata represent, for example, each of the image features in the form of a respective vector.

As disclosed above, a vector of this type can contain and/or describe one or more characteristics of the respective image feature. A vector of this type can be obtained, for example, as a result of the application of a method and/or an algorithm to the image data and/or to the image represented by the image data. Examples of a method and/or an algorithm of this type are a method and an algorithm for describing key points such as the SIFT (Scale-Invariant Feature Transform) algorithm or the SURF (Speeded Up Robust Features) algorithm. The image features can be represented correspondingly by the metadata as SIFT image features or SURF image features in the form of a vector.

In one example embodiment of the invention, the method further comprises:

providing the distribution and/or sorting information in such a way that an automated sorting and/or distribution of the consignment is enabled and/or caused at least partially on the basis of the distribution and/or sorting information.

The distribution and/or sorting information is intended to be understood to be provided in such a way that an automated sorting and/or distribution of the consignment is enabled and/or caused at least partially on the basis of the distribution and/or sorting information if the distribution and/or sorting information can be obtained (e.g. captured and/or received) by an automatic distribution and/or sorting apparatus which distributes and/or sorts the consignment. For this purpose, the distribution and/or sorting information can be provided (e.g. printed) in written form (e.g. as an address indication in a predetermined language) and/or in the form of a two-dimensional code on the surface of the consignment. One example of a two-dimensional code of this type is an alphanumeric code, a barcode or a QR code. Alternatively or additionally, the distribution and/or sorting information can be transmitted to the automatic distribution and/or sorting apparatus.

Providing the distribution and/or sorting information therefore comprises, for example, printing the distribution and/or sorting information on the surface of the consignment and/or transmitting the distribution and/or sorting information to a remote apparatus (e.g. an automatic distribution and/or sorting apparatus).

In one example embodiment of the invention, the method further comprises:

distributing and/or sorting the consignment in an automated manner at least partially on the basis of the distribution and/or sorting information.

The automated distribution and/or sorting of the consignment is performed, for example, by an automatic sorting and distribution apparatus.

This is intended to be understood, for example, to mean that the distribution and/or sorting information is taken into account in the automated distribution and/or sorting of the consignment (e.g. by an automatic distribution and/or sorting apparatus), so that the distribution and/or sorting of the consignment is influenced (e.g. controlled) (e.g. by the automatic distribution and/or sorting apparatus). As disclosed above, the distribution and/or sorting information for the automated distribution and/or sorting of the consignment is configured, for example, to influence (e.g. to control) the distribution and/or sorting of the consignment by an automatic distribution and/or sorting apparatus, for example so that the consignment is sorted together with other consignments which are intended to be delivered in the same delivery area as the consignment.

In one example embodiment of the invention, the method further comprises:

providing a data model for determining the distribution and/or sorting information for the automated distribution and/or sorting of the consignment, or accessing a data model for determining the distribution and/or sorting information for the automated distribution and/or sorting of the consignment.

Providing the data model is intended to be understood to mean, for example, that the data model is stored in a memory of the at least one apparatus which performs the method; and accessing the data model is intended to be understood to mean, for example, that the at least one apparatus which performs the method accesses the data model stored by an apparatus which is remote from the at least one apparatus which performs the method (e.g. via a wireless and/or wired communication connection).

The determination of the distribution and/or sorting information for the automated distribution and/or sorting of the consignment is based, for example, at least partially on the data model. In other words, the data model can be taken into account in determining the distribution and/or sorting information for the automated distribution and/or sorting of the consignment.

The data model assigns, for example, the distribution and/or sorting information for the automated distribution and/or sorting of the consignment to the image features represented by the metadata.

The data model is, for example, a database. As disclosed above, distribution and/or sorting information determined for other consignments can, for example, be stored in entries of the database together with representations of image features of images of the surfaces of these other consignments, so that the image features represented by the database can be compared with the image features represented by the metadata. If the comparison indicates that the image features of an entry in the database represented by the database are at least essentially similar (e.g. based on a similarity measure and/or a predetermined similarity threshold value) or correspond to the image features represented by the metadata, it can be provided, for example, that the distribution and/or sorting information stored in the database entry together with the representation of these image features is assigned to the image features represented by the metadata and is determined as distribution and/or sorting information for the automated distribution and/or sorting of the consignment.

Alternatively or additionally, the data model can be obtained through machine learning. One example of a data model of this type obtained through machine learning is an artificial neural network. The data model is obtained, for example, as a result of a learning phase according to an algorithm for machine learning (e.g. an algorithm according to the deep learning method). The data model is trained in the learning phase, for example, on the basis of results of the determination of distribution and/or sorting information for other consignments and image features of images of the surfaces of these other consignments.

A data model of this type obtained through machine learning (e.g. an artificial neural network) obtains the image features represented by the metadata, for example as input parameters, and outputs the distribution and sorting information for the automated distribution and/or sorting of the consignment assigned by the data model to these image features as output parameters.

In one example embodiment of the invention, the metadata are determined independently from a recognition of characters contained in the image represented by the image data and/or independently from characters contained in the image represented by the image data and/or their meaning.

Further advantageous example embodiments of the invention are set out in the following detailed description of some example embodiments of the present invention, particularly in conjunction with the figures. However, the figures are intended to serve for explanatory purposes only, and not to determine the protective scope of the invention. The attached drawings are not necessarily true-to-scale, and are intended simply to reflect the general concept of the present invention by way of example. In particular, features which are contained in the figures are not intended in any way as a necessary component of the present invention.

BRIEF DESCRIPTION OF THE DRAWINGS

In the figures.

DETAILED DESCRIPTION

Figure 1:
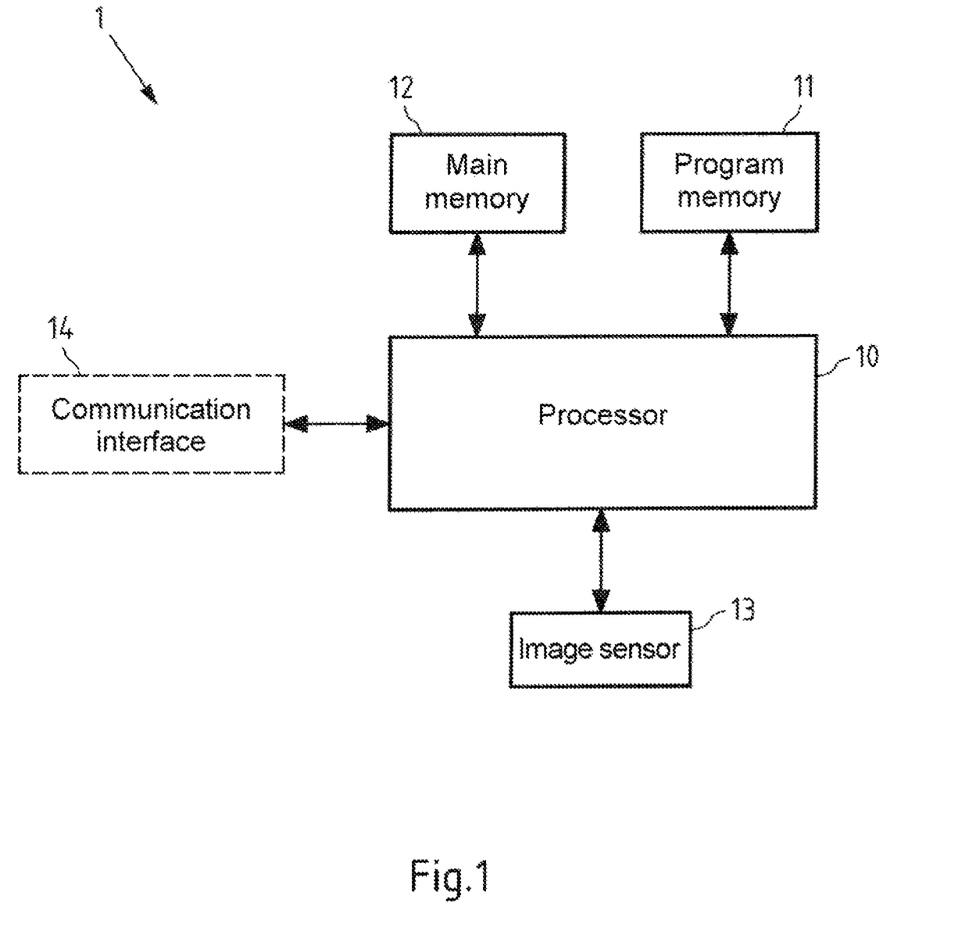
FIG. 1 shows a schematic view of an example embodiment of an apparatus according to the invention.

FIG. 1 is a schematic view of an example embodiment of an apparatus 1 according to the invention.

The apparatus 1 comprises, by way of example, a processor 10 and, connected to the processor 10, a first memory as a program memory 11, a second memory as a main memory 12 and an image sensor 13. The apparatus 1 can furthermore optionally comprises a communication interface 14.

A processor such as the processor 10 is intended to be understood to mean, for example, a microprocessor, a micro control unit, a microcontroller, a digital signal processor (DSP), an Application-Specific Integrated Circuit (ASIC) or a Field Programmable Gate Array (FPGA). The apparatus 1 can obviously also comprise a plurality of processors 10.

The processor 10 executes program instructions which are stored, for example, in the program memory 11, and stores, for example, interim results or similar in the main memory 12. The program memory 11 contains, for example, program instructions of a computer program which comprises program instructions which cause the processor 10 to perform and/or control the disclosed method (e.g. the method according to the flow diagram 2 shown in FIG. 2) when the processor 10 executes these program instructions stored in the program memory 11. The program memory 11 can further comprise the database 4 shown in FIG. 4.

The program memory 11 further contains, for example, the operating system of the apparatus 1 which is loaded at least partially into the main memory 12 and is executed by the processor 10 when the apparatus 1 is started. In particular, at least a part of the core of the operating system is loaded into the main memory 12 and is executed by the processor 10 when the apparatus 1 is started. One example of an operating system is a Windows, UNIX, Linux, Android, Apple iOS and/or MAC OS operating system. The operating system enables, in particular, the use of the apparatus 1 for data processing. It manages, for example, resources such as a main memory and a program memory, makes, inter alia, fundamental functions available to other computer programs through programming interfaces and controls the execution of computer programs.

A program memory such as the program memory 11 is, for example, a non-volatile memory such as a flash memory, a magnetic memory, an EEPROM memory (Electrically Erasable Programmable Read-Only Memory) and/or an optical memory. A main memory such as the main memory 12 is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

The main memory 12 and the program memory 11 can also be designed as one memory. Alternatively, the main memory 12 and/or the program memory 11 can be formed in each case by a plurality of memories. The main memory 12 and/or the program memory 11 can furthermore also be part of the processor 10.

The image sensor 13 is configured, for example, to capture a surface of a consignment and to generate image data which represent an image (e.g. the image 3 shown in FIG. 3a) of the surface of the consignment captured by the image sensor 13. The apparatus 1 can accordingly obtain image data by means of the image sensor 13. One example of an image sensor of this type is a CMOS sensor, a CCD sensor or a camera.

The communication interface 14 of the apparatus 1 can be a wireless or wired communication interface. The communication interface 14 is configured, for example, to communicate with remote apparatuses via a wireless and/or wired communication connection. A wired communication connection is preferably intended to be understood to mean a communication connection via a wired communication network such as an Ethernet communication network. Ethernet is specified, for example, in the standards of the IEEE-802.3 family. One example of a wireless communication connection is a communication connection according to a wireless communication technology such as Wireless Local Area Network (WLAN) or 2G/3G/4G/5G. WLAN is specified, for example, in the standards of the IEEE-802.11 family. The 2G/3G/4G/5G mobile radio specifications are maintained and developed by the 3rd Generation Partnership Project (3GPP) and are currently available on the Internet, e.g. at www.3gpp.com.

The apparatus 1 can communicate with remote apparatuses by means of the communication interface 14, e.g. it can receive (i.e. obtain) image data from remote apparatuses and/or can access a database stored in a memory of a remote apparatus.

The components 10 to 14 of the apparatus 1 are interconnected for communication purposes and/or operational purposes via one or more bus systems (e.g. one or more serial and/or parallel bus connections).

The apparatus 1 can obviously comprise further components such as, for example, a user interface, in addition to the components 10 to 14.

Figure 2:
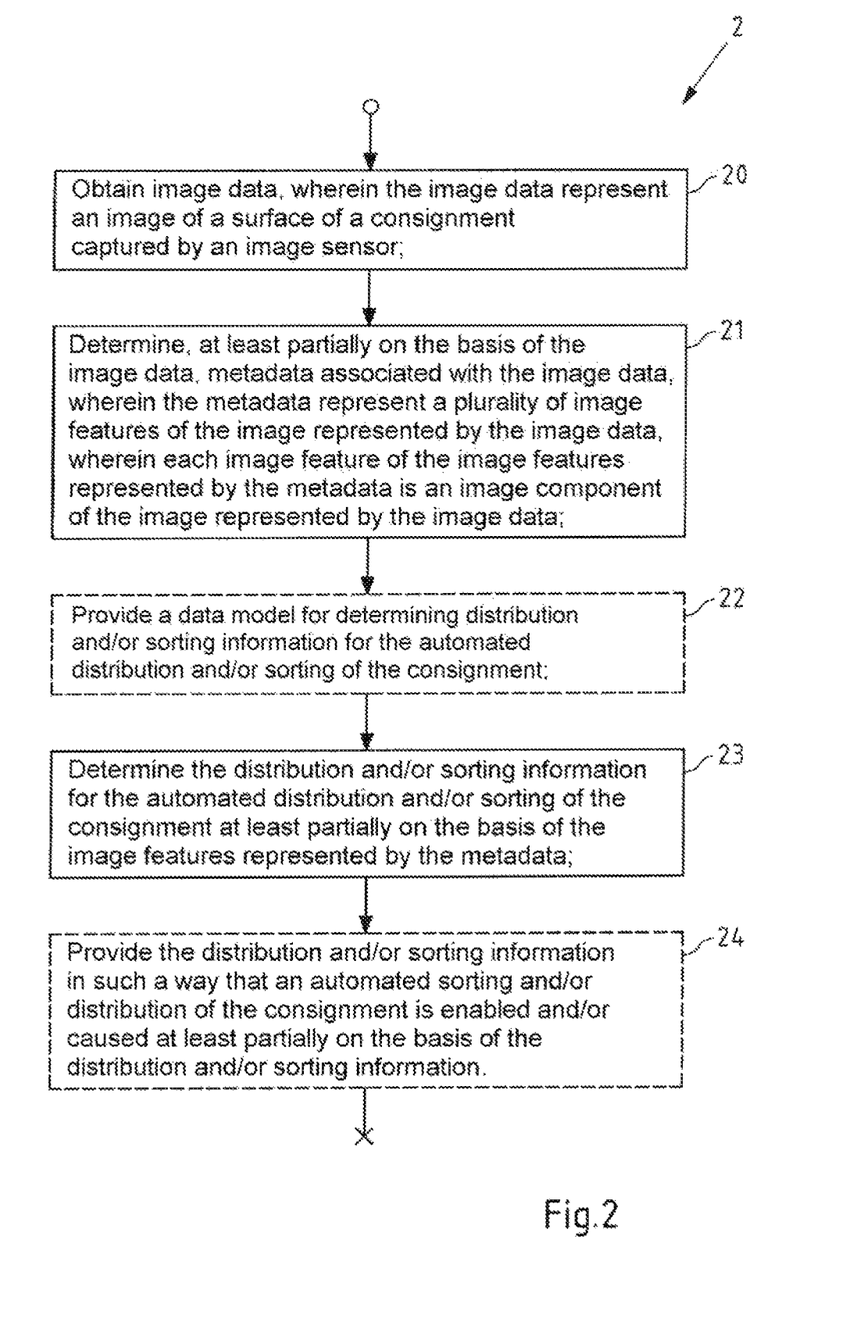
FIG. 2 shows a flow diagram of an example embodiment of a method according to the invention.

FIG. 2 shows a flow diagram 2 of an example embodiment of a method according to the invention of which the method steps 20 to 24 are explained below by way of example. It is assumed here that the method steps 20 to 24 are performed by the apparatus 1 disclosed above in connection with FIG. 1.

In a step 20, the apparatus 1 obtains image data, wherein the image data represent an image of a surface of a consignment captured by the image sensor 13.

The image sensor 13 captures, for example, the surface of the consignment and generates the image data which represent an image of the surface of the consignment captured by the image sensor 13, in step 20. The image data generated by the image sensor 13 can represent the image of the surface of the consignment captured by the image sensor 13 according to a standardized image data format. As explained above, one example of a standardized image data format of this type for a raster graphic and/or pixel graphic is the JPEG File Interchange Format (JFIF) or the Tagged Image File Format (TIFF).

Figure 3A:
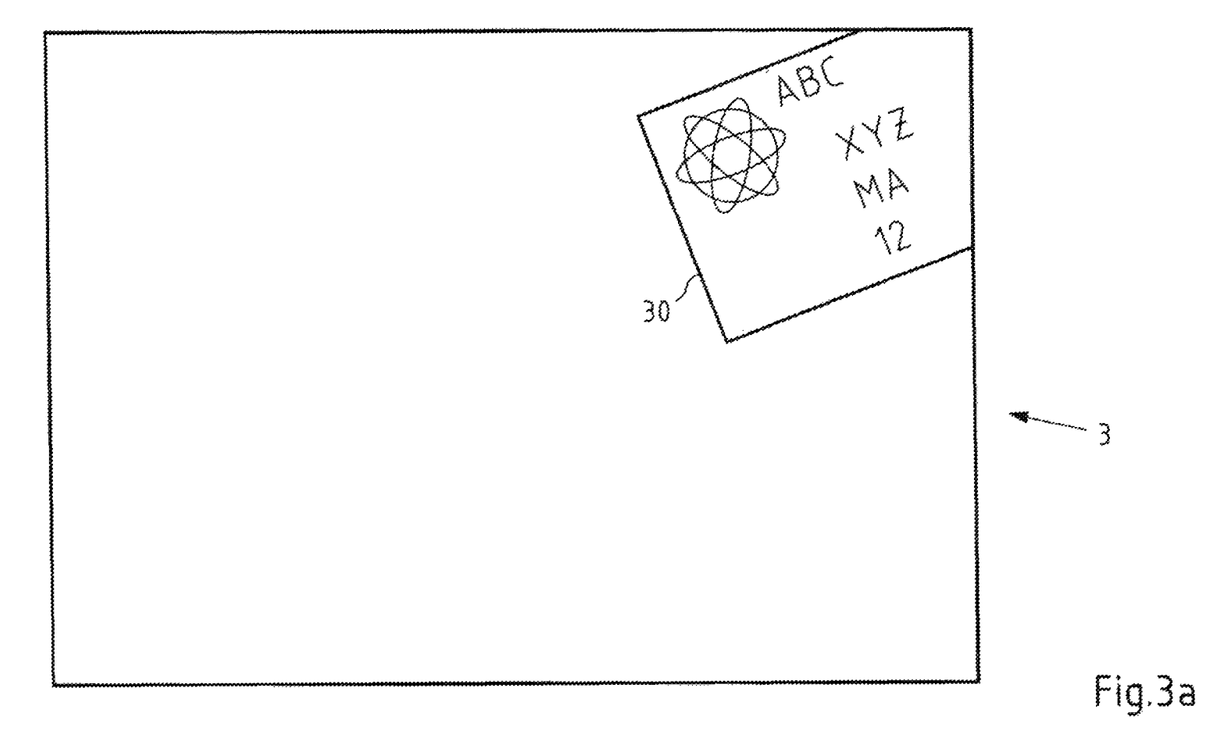
FIGS. 3a-b show schematic views of an image represented by the image data of an example embodiment according to the invention.

FIG. 3a is a schematic view of an image 3, represented by the image data obtained in step 20, of an example embodiment according to the invention. It is assumed below that FIG. 3a shows the image 3 of the surface of the consignment captured by the image sensor 13 in step 20. The image 3 contains, inter alia, an address field 30 of the consignment. Characters and a logo are present in the address field 30.

In a step 21, the apparatus 1 determines metadata associated with the image data, at least partially on the basis of the image data obtained in step 20. The metadata represent a plurality of image features of the image 3 represented by the image data; and each image feature of the image features represented by the metadata is an image component of the image 3 represented by the image data.

As disclosed above, an image feature is intended to be understood to mean, for example, an image component which is characteristic of the image 3 represented by the image data and/or an (e.g. predetermined) image section of the image 3 represented by the image data. An image feature of this type (e.g. each of the image features) is, for example, a segment contained in the image and/or in an (e.g. predetermined) image section of the image such as an edge, a corner, a region, a key point or a pattern.

Determining the metadata in step 21 correspondingly comprises, for example, determining the image features at least partially on the basis of the image data. The image features can be obtained, for example, as a result of the application of a segmentation method and/or a segmentation algorithm to the image data and/or to the image represented by the image data. Segmentation methods and/or segmentation algorithms disclosed above by way of example are pixel-oriented segmentation methods (e.g. threshold value methods), edge-oriented segmentation methods (e.g. edge detection methods such as the Sobel operator, the Scharr operator or the Laplace filter), region-oriented segmentation methods (e.g. the region growing method), model-based segmentation methods (e.g. the Hough transform) and detection methods for detecting key points (e.g. detection methods according to the SIFT (Scale-Invariant Feature Transform) algorithm or the SURF (Speeded Up Robust Features) algorithm).

Figure 3B:
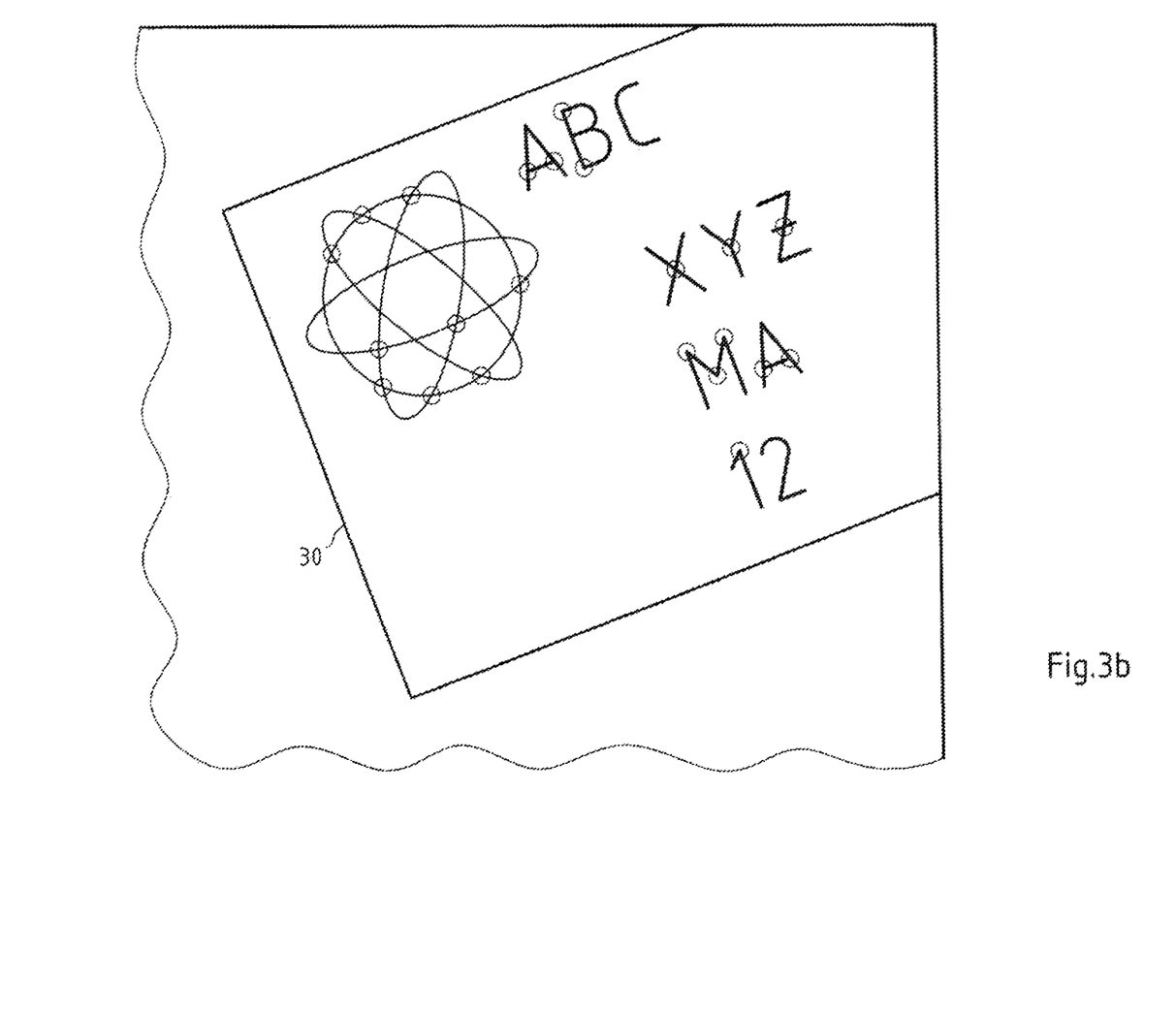

FIG. 3b shows schematically the result of the application of a segmentation method of this type and/or a segmentation algorithm to the image data obtained in step 20 and/or to the image 3 represented by the image data. FIG. 3b shows an enlarged image section of the image 3 with the address field 30. The image features obtained as a result of the application of a segmentation method and/or a segmentation algorithm to the image data and/or to the image 3 represented by the image data are circled in FIG. 3b. The image features circled in FIG. 3b are part of the address field 30. This is the case, for example, if only the address field of the consignment or image components which are part of the address field 30 are taken into account in determining the image features during the determination of the metadata in step 21, e.g. whereby the segmentation method and/or segmentation algorithm is/are applied to only a part of the image data obtained in step 20 which represents the address field 30, or an image section of the image 3 which represents the address field 30. The image features circled by way of example in FIG. 3b are edges, corners and other key points of the image section of the image 3 which represents the address field 30. These image features are obviously merely examples and the image 3 obtained as a result of the application of a segmentation method and/or a segmentation algorithm to the image data obtained in step 20 and/or to the image 3 represented by the image data, completely different image features of the image 3 can also be obtained.

That the metadata represent a plurality of image features of the image 3 represented by the image data is intended to be understood, for example, to mean that the metadata represent a respective characteristic (e.g. a position, a shape, a size, a color or an orientation of the image component) of the respective image feature or a characteristic of the respective surrounding area of the respective image feature for each of the image features. Determining the metadata in step 21 correspondingly comprises, for example, determining a representation of the image features or for each of the image features.

One example of such a representation of a respective image feature is a vector which contains and/or describes one or more characteristics of the respective image feature. A vector of this type can be obtained, for example, as a result of the application of a method and/or an algorithm to the image data and/or to the image represented by the image data. Examples disclosed above of a method of this type and/or an algorithm of this type are a method and/or an algorithm for describing key points, such as the SIFT (Scale-Invariant Feature Transform) algorithm or the SURF (Speeded Up Robust Features) algorithm. The image features can be represented correspondingly by the metadata as SIFT image features or SURF image features in the form of a vector. The invention is obviously not restricted to these methods and/or algorithms.

It is assumed below by way of example that the metadata determined in step 21 represent a respective position of the respective image feature for each of the image features of the image 3 circled in FIG. 3b. The positions of the image features circled in FIG. 3b represented by the metadata can, for example, be relative positions which describe the position of the image features circled in FIG. 3b relative to one another.

In an optional step 22, the apparatus 1 provides a data model for determining distribution and/or sorting information for the automated distribution and/or sorting of the consignment. This is intended to be understood, for example, to mean that the data model is stored in the program memory 11 of the apparatus 1.

As disclosed above, examples of a data model of this type are a database and/or an artificial neural network obtained by machine learning. Both a database of this type and an artificial neural network of this type can take into account the distribution and/or sorting information determined for other consignments and image features of images of the surfaces of these other consignments. These other consignments may, for example, be consignments from the past for which distribution and/or sorting information was determined in each case in the past.

Figure 4:
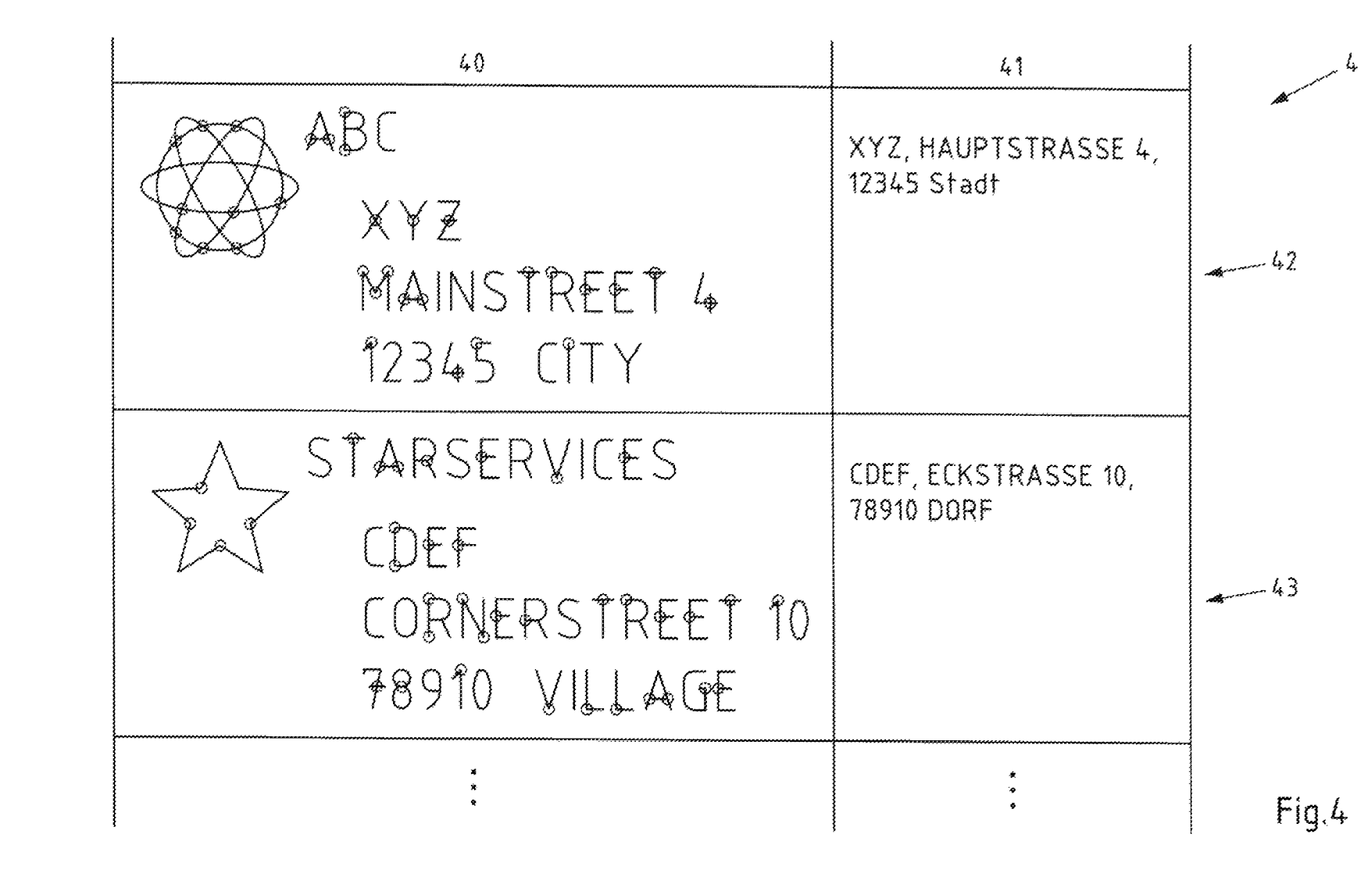
FIG. 4 shows a schematic view of an example embodiment of a database according to the invention.

FIG. 4 is a schematic view of an example embodiment of a database 4 according to the invention. The database 4 comprises two columns 40 and 41 and two rows 42 and 43. Each row corresponds in each case to an entry of the database 4 for a respective consignment from the past. For each entry in the database, the column 40 in each case contains a representation of the image features of an image of a surface of the respective consignment from the past; and for each entry in the database, the column 41 in each case contains sorting and/or distribution information determined for the respective consignment from the past.

The image features represented in column 40 are circled in FIG. 4. This is obviously a schematic view only, and the image features can be represented by the database 4 in column 40 in a different way (e.g. in the form of vectors). The circled features are also by way of example only. Each entry in column 40 preferably contains a representation of the image features of the image of the surface of the respective consignment from the past which corresponds to the form of the representation of the image features by the metadata determined in step 21. The representations contained in column 40 are determined, for example, in the same way as the metadata determined in step 21. It is therefore assumed below by way of example that the database 4 represents in column 40 a respective position of the respective image feature for each of the image features circled in FIG. 4. The positions of the image features circled in FIG. 4 represented by the database 4 in column 40 can, for example, be relative positions which describe the position of the image features circled in FIG. 4 relative to one another.

The distribution and/or sorting information is further shown as address details in column 41 of the database 4 for a clearer understanding. The distribution and/or sorting information in column 41 can obviously alternatively also represent, for example, a two-dimensional code such as an alphanumeric code, a barcode or a QR code.

The database 4 can have further columns and/or rows.

In a step 23, the apparatus 1 determines the distribution and/or sorting information for the automatic distribution and/or sorting of the consignment at least partially on the basis of the image features represented by the metadata. The determining in step 23 is further performed, for example, at least partially on the basis of the database 4.

The image features represented by the metadata determined in step 21 can, for example, be compared with the features represented by the database 4 for the consignments from the past. The comparison can be performed, for example, according to a comparison method for comparing image features or their representations such as a comparison method for comparing SIFT or SURF image features in the form of vectors in which the distance (e.g. the Euclidean distance) between the respective vectors is used as a similarity measure (i.e. the shorter the distance between two vectors, the more similar the image features represented by the vectors). If the comparison indicates that the image features represented by the database 4 for a consignment from the past are at least essentially similar (e.g. based on a similarity measure and/or a predetermined similarity threshold value) or correspond to the image features represented by the metadata, it can be provided, for example, that the distribution and/or sorting information stored in the database together with the representation of these image features is assigned to the image features represented by the metadata and is determined as distribution and/or sorting information for the automated distribution and/or sorting of the consignment in step 23.

As disclosed above, it is assumed here that the metadata and the database represent only the respective position of the image features. The comparing can be performed correspondingly, for example, by means of a comparison of the positions. The comparison of the positions of the image features circled in FIG. 3b with the positions of the image features circled in FIG. 4 indicates that the image features represented by the entry in row 42 differ less from the image features represented by the metadata than the image features represented by the entry in row 43. The distribution and/or sorting information contained in the entry in row 42 in column 41, for example, are correspondingly determined in step 23 as distribution and/or sorting information for the automated distribution and/or sorting of the consignment.

In an optional step 24, the apparatus 1 provides the distribution and/or sorting information determined in step 23 in such a way that an automated sorting and/or distribution of the consignment is enabled and/or caused at least partially on the basis of the distribution and/or sorting information. As disclosed above, this can be done, for example, by printing the distribution and/or sorting information on the surface of the consignment.

As becomes clear in connection with the representations shown in FIGS. 3a and 3b and FIG. 4, this method is performable even if an automatic recognition and evaluation of the characters in the address field are not possible. The address field 30 in FIG. 3b is thus only partially visible since it is affixed over the corner of the consignment shown, so that not all characters contained therein can be recognized and evaluated. However, since the method with the steps according to flow diagram 2 takes into account image features (and no recognized characters) in determining the distribution and sorting information, the distribution and sorting information can nevertheless be determined with the method according to the invention, provided that the image features suffice, for example, for a comparison with the image features contained in the database 4. Additional structures in the form of the metadata are thus made available according to the invention for the determination (e.g. on the basis of a data model (such as an artificial neural network and/or a database) and/or an algorithm (such as a classifier or a classification method)), so that the distribution and/or sorting information can be determined at the meta level and/or image level (as opposed to the writing level). An interpretation or evaluation of the characters contained in the address field or a translation of the written information (e.g. from the language of the address detail in the address field 30 (here: English) into a predetermined language (e.g. the official language of the delivery area, here: German)) is not required. This method also enables the joint processing of different image components such as the address field and barcode as image features in a system and/or with a method. Language barriers can furthermore be overcome fully automatically as a result, as indicated by the English address detail in the address field 30 and the distribution and sorting information in German (i.e. in the official language of the delivery area) in the database 4.

Figure 5:
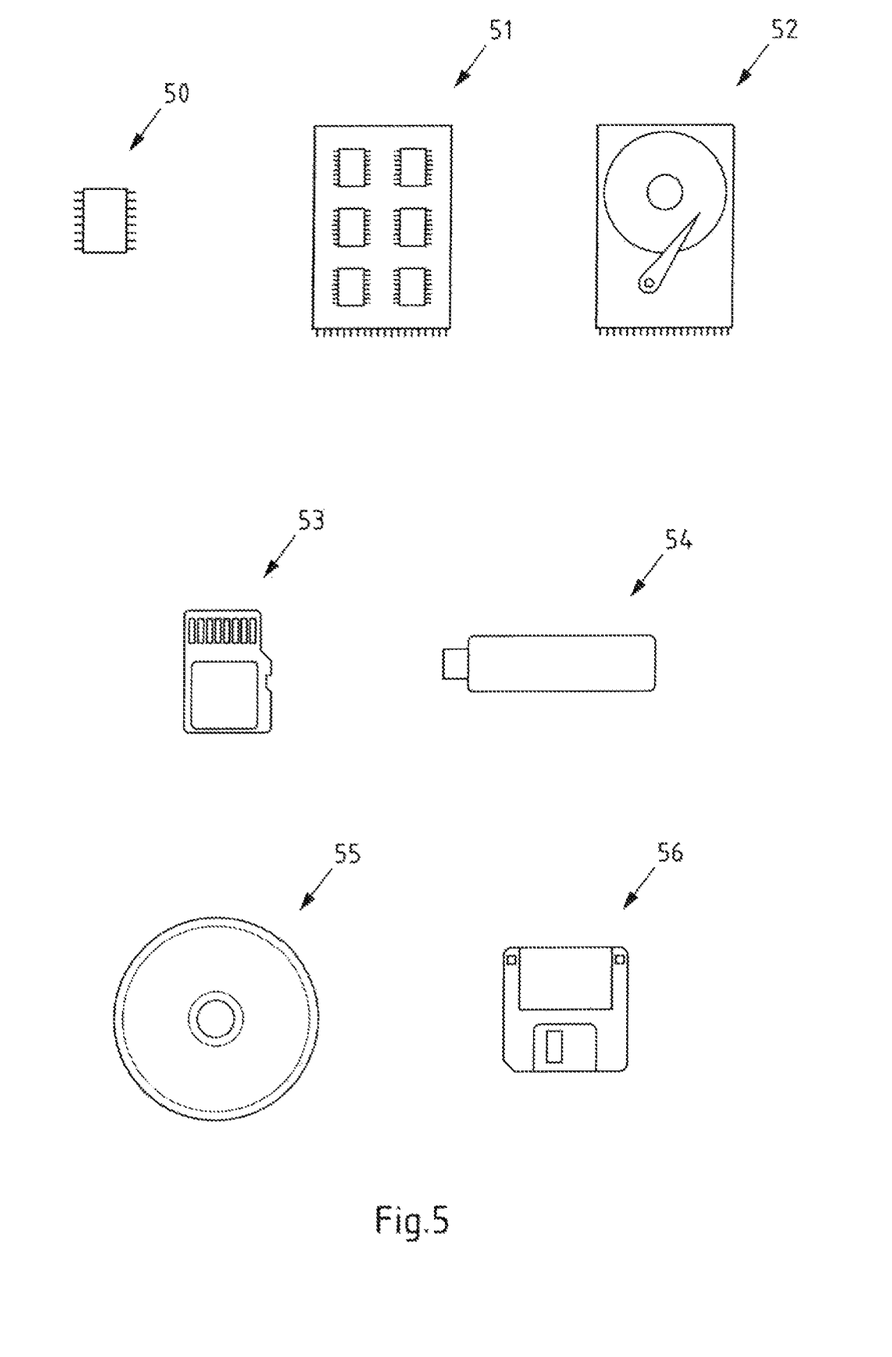
FIG. 5 shows example embodiments of storage media.

Finally, FIG. 5 shows example embodiments of storage media on which an example embodiment of a computer program according to the invention can be stored. The storage medium can, for example, be a magnetic, electrical, optical and/or other type of storage medium. The storage medium can, for example, be part of a processor (e.g. the processor 10 of the apparatus 1 shown in FIG. 1), for example a (non-volatile or volatile) program memory of the processor or a part thereof (e.g. the memory 11 of the apparatus 1 shown in FIG. 1). Example embodiments of a storage medium are a flash memory 50, an SSD hard disk 51, a magnetic hard disk 52, a memory card 53, a memory stick 55 (e.g. a USB stick), a CD-ROM or DVD 55 or a diskette 56.

The example embodiments of the present invention described in this specification are also intended to be understood as disclosed in all combinations with one another. In particular, the description of a feature comprised by an example embodiment is also not intended to be understood here—unless explicitly stated otherwise—to mean that the feature is indispensable or essential for the function of the example embodiment. The sequence of the method steps set out in this specification in the individual flow diagrams is not mandatory, and alternative sequences of the method steps are conceivable, unless otherwise indicated. The method steps can be implemented in different ways, so that an implementation in software (through program instructions), hardware or a combination of both is conceivable for the implementation of the method steps.

Terms such as "comprise", "have", "entail", "contain" and the like used in the patent claims do not exclude further elements or steps. The wording "at least partially" includes both the case "partial" and the case "complete". The wording "and/or" is intended to be understood to mean that both the alternative and the combination are intended to be disclosed, so that "A and/or B" means "(A) or (B) or (A and B)". In connection with this specification, a plurality of units, persons or the like means several units, persons or the like. The use of the indefinite article does not exclude a plurality. A single apparatus can perform the functions of a plurality of units or apparatuses specified in the patent claims. Reference numbers indicated in the patent claims are not to be regarded as restrictions of the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by at least one apparatus, said method comprising:
    obtaining image data, wherein the image data represent an image of a surface of a consignment captured by an image sensor,
    determining, at least partially on the basis of the image data, metadata associated with the image data, wherein the metadata represent a plurality of image features of the image represented by the image data, wherein each image feature of the image features represented by the metadata is an image component of the image represented by the image data,
    providing or accessing a data model for determining the distribution or sorting information for the automated distribution or sorting of the consignment, wherein the data model is based on distribution or sorting information determined for other consignments and image features of images of the surfaces of these other consignments, and
    determining the distribution or sorting information for the automated distribution or sorting of the consignment at least partially on the basis of the image features represented by the metadata and based at least partially on the data model.

2. The method according to claim 1, wherein at least one of the image features is at least one of the following image components:
    a respective region contained in the image,
    a respective corner contained in the image,
    a respective edge contained in the image,
    a respective key point contained in the image, or
    a respective pattern contained in the image.

3. The method according to claim 2, wherein the region, corner, edge, key point or pattern contained in the image represents an address field of the consignment or a part of the address field of the consignment.

4. The method according to claim 1, wherein the metadata, for at least one of the image features, represent at least one of the following characteristics of the respective image feature or its surrounding area:
  a size of the respective image feature,
  a shape or outline of the respective image feature,
  a position of the respective image feature,
  a color of the respective image feature or in the surrounding area of the respective image feature,
  an orientation of the respective image feature or its surrounding area,
  a geometric center of the respective image feature,
  moments of the respective image feature or its surrounding area.

5. The method according to claim 1, wherein the metadata represent one or more of the image features in the form of a vector.

6. The method according to claim 1, said method further comprising,
  providing the distribution or sorting information in such a way that an automated sorting or distribution of the consignment is enabled or caused at least partially on the basis of the distribution or sorting information, and
  distributing or sorting the consignment in an automated manner at least partially on the basis of the distribution or sorting information.

7. The method according to claim 1, wherein the data model assigns the distribution or sorting information for the automated distribution or sorting of the consignment to the image features represented by the metadata.

8. The method according to claim 1, wherein the data model does not contain any information relating to the consignment for which distribution or sorting information for the automated distribution or sorting of the consignment are determined.

9. The method according to claim 1, wherein the data model is obtained through machine learning.

10. The method according to claim 1, wherein the metadata are determined independently from at least one of a recognition of characters contained in the image represented by the image data or characters contained in the image represented by the image data or their meaning.

11. A non-transitory computer readable storage medium, in which computer program code is stored, wherein the computer program code causes an apparatus to perform, when executed by a processor:
  obtaining image data, wherein the image data represent an image of a surface of a consignment captured by an image sensor,
  determining, at least partially on the basis of the image data, metadata associated with the image data, wherein the metadata represent a plurality of image features of the image represented by the image data, wherein each image feature of the image features represented by the metadata is an image component of the image represented by the image data,
  providing or accessing a data model for determining the distribution or sorting information for the automated distribution or sorting of the consignment, wherein the data model is based on distribution or sorting information determined for other consignments and image features of images of the surfaces of these other consignments, and
  determining the distribution or sorting information for the automated distribution or sorting of the consignment at least partially on the basis of the image features represented by the metadata and based at least partially on the data model.

12. Apparatus, comprising at least one processor and at least one memory containing computer program code, the at least one memory and the computer program code with the at least one processor configured to cause the apparatus at least to perform:
  obtaining image data, wherein the image data represent an image of a surface of a consignment captured by an image sensor,
  determining, at least partially on the basis of the image data, metadata associated with the image data, wherein the metadata represent a plurality of image features of the image represented by the image data, wherein each image feature of the image features represented by the metadata is an image component of the image represented by the image data,
  providing or accessing a data model for determining the distribution or sorting information for the automated distribution or sorting of the consignment, wherein the data model is based on distribution or sorting information determined for other consignments and image features of images of the surfaces of these other consignments, and
  determining the distribution or sorting information for the automated distribution or sorting of the consignment at least partially on the basis of the image features represented by the metadata and based at least partially on the data model.

13. The apparatus according to claim 12, wherein at least one of the image features is at least one of the following image components:
  a respective region contained in the image,
  a respective corner contained in the image,
  a respective edge contained in the image,
  a respective key point contained in the image, or
  a respective pattern contained in the image.

14. The apparatus according to claim 13, wherein the region, corner, edge, key point or pattern contained in the image represents an address field of the consignment or a part of the address field of the consignment.

15. The apparatus according to claim 12, wherein the metadata, for at least one of the image features, represent at least one of the following characteristics of the respective image feature or its surrounding area:
  a size of the respective image feature,
  a shape or outline of the respective image feature,
  a position of the respective image feature,
  a color of the respective image feature or in the surrounding area of the respective image feature,
  an orientation of the respective image feature or its surrounding area,
  a geometric center of the respective image feature,
  moments of the respective image feature or its surrounding area.

16. The apparatus according to claim 12, wherein the metadata represent one or more of the image features in the form of a vector.

17. The apparatus according to claim 12, the at least one memory and the computer program code with the at least one processor further configured to cause the apparatus at least to perform:
  providing the distribution or sorting information in such a way that an automated sorting or distribution of the consignment is enabled or caused at least partially on the basis of the distribution or sorting information, or
  distributing or sorting the consignment in an automated manner at least partially on the basis of the distribution or sorting information.

18. The apparatus according to claim 12, wherein the data model assigns the distribution or sorting information for the automated distribution or sorting of the consignment to the image features represented by the metadata.

19. The apparatus according to claim 12, wherein the data model does not contain any information relating to the consignment for which distribution or sorting information for the automated distribution or sorting of the consignment are determined.

\* \* \* \* \*